Figure 1:
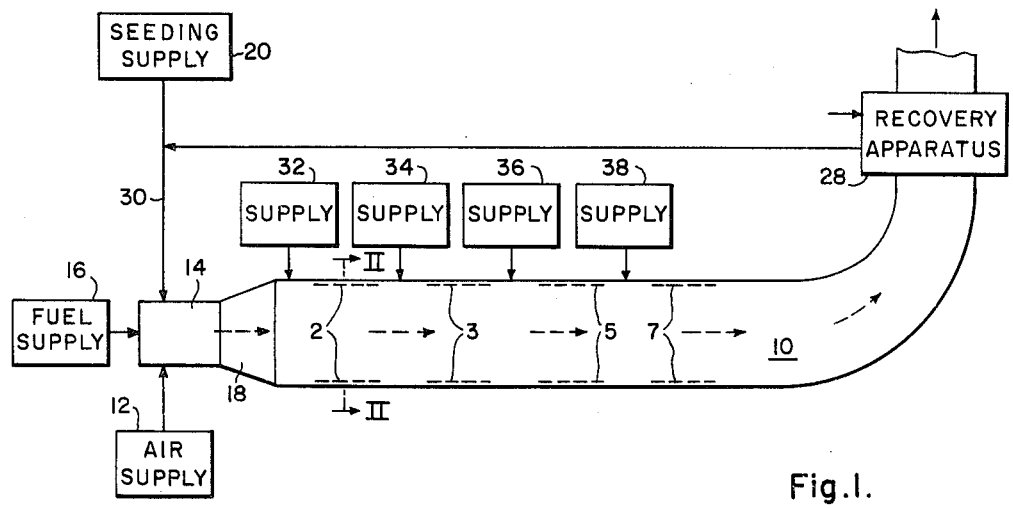

Oct. 12, 1965    R. L. HUNDSTAD    3,211,932

MAGNETOHYDRODYNAMIC GENERATOR

Filed July 13, 1962

WITNESSES
Edwin L. Bassler
James F. Young

INVENTOR
Richard L. Hundstad
BY F. P. Lyle
ATTORNEY

United States Patent Office 3,211,932
Patented Oct. 12, 1965

3,211,932
MAGNETOHYDRODYNAMIC GENERATOR
Richard L. Hundstad, Forest Hills, Pa., assignor to Westinghouse Electric Corporation, East Pittsburgh, Pa., a corporation of Pennsylvania
Filed July 13, 1962, Ser. No. 209,586
8 Claims. (Cl. 310—11)

The present invention relates to energy conversion apparatus, and more particularly to magnetohydrodynamic energy conversion apparatus.

The conventional process of generating electrical energy comprises moving metallic conductors through a magnetic field. Usually, the energy conversion is from thermal to mechanical to electrical energy. Electrical energy can also be generated by moving fluid conductors in a magnetic field. However, in order to achieve a direct energy conversion, thermal to electrical, it is necessary to use a gas in order to realize an appreciable volume change. Large quantities of electrical energy may be efficiently generated through the use of magnetohydrodynamic (MHD) techniques. An MHD generator utilizes an electrically conducting working fluid, such as a combustion product gas, which is thermally ionized and seeded with an alkali metal to make the gas more conductive. The ionized gas is then passed through a transverse magnetic field. Current collecting electrodes are disposed along the flow of the electrically conducting working fluid to collect current that is generated due to the movement of the electrically conducting gas through the magnetic field.

The general theory of operation of an MHD generator is fully described in a copending application Serial No. 202,714, entitled Magnetohydrodynamic Generating Apparatus, filed June 15, 1962, by Stewart Way and assigned to the same assignee as the present invention. As disclosed in that application, in order to maintain an efficient cycle of operation, without excessive generator length, it is necessary that thermally ionized gas be maintained in a state of high electrical conductivity throughout its passage through the generator. Thus, the gas must be kept at a high temperature of the order of 4500° F. The electrical conductivity of the combustion product working fluid, seeded with an alkali metal such as potassium or cesium, increases rapidly with temperature. For instance, an increase of 400° F. may triple the conductivity of the working fluid. Because of the temperature limitations of the best refractory materials known today, it is necessary that the operating temperature of the MHD generator be held to a maximum of approximately 4500° F. However, the working fluid must be maintained near this maximum temperature or else the conductivity of the working fluid will drop, and thus greatly diminish the energy output of the generator.

It is therefore an object of the present invention to provide new and improved MHD energy conversion apparatus wherein high efficiency and high power density energy extraction is obtained.

It is a further object of the present invention to provide new and improved MHD energy conversion apparatus in which high efficiency is obtained by continuously heating the electrically conducting working fluid as it passes through the generator.

Broadly, the present invention provides magnetohydrodynamic energy conversion apparatus in which an electrically conducting working fluid is passed through an MHD generator and in which the working field is continuously maintained in a state of high electrically conductivity throughout the passage.

Figure 2:
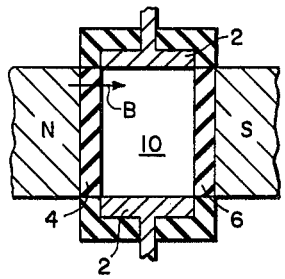

These and other objects will become more apparent when considered in view of the following specification and drawings in which:

FIG. 1 is a schematic diagram of a magnetohydrodynamic energy conversion system utilizing the teachings of the present invention; and, FIG. 2 is a sectional view of a portion of FIG. 1 taken at line II—II of FIG. 1.

Referring to FIG. 1, an MHD generating system is shown which uses combustion product gases as the working fluid. The generator is shown as comprising a combustion chamber, a mixing chamber and a generating chamber, and includes a duct 10, through which the working fluid passes in the direction shown by the arrows.

FIG. 2 shows a sectional view of the generator chamber. A pair of conducting electrodes 2 is shown disposed at the top and bottom of the duct 10. The insulating walls 4 and 6 of suitable refractory material provide the other boundaries of the duct 10. Magnetic pole members N and S disposed adjacent the wall members 4 and 6 represent any suitable means for providing a magnetic field B transverse to the flow of working fluid through the duct 10. As is shown in FIG. 1, other electrode pairs 3, 5 and 7 may be disposed along the duct 10.

The air supply 12 supplies oxygen to the combustion chamber 14 of the generator, preferably in the form of compressed and preheated air. Fuel is supplied to the combustion chamber 14 through a suitable orifice from the input fuel supply 16. The fuel is burned in the combustion chamber and the gaseous combustion products pass into the mixing chamber 18 at a high enough temperature for the thermal ionization, and then pass downstream through the duct 10. In order to cause the working fluid thus provided to ionize more readily and to be an alkali metal such as potassium, sodium or cesium is more highly conductive, a seeding material comprising supplied into the flow through a suitable orifice in the combustion chamber 14 of the MHD generator. The seeding material is supplied from the seeding supply 20. Thus, as the ionized combustion gas working fluid passes through the duct 10 of the generator through the transverse magnetic field, electrical energy is generated with the current taken from the electrode pairs 2, 3, 5 and 7 disposed at the top and bottom of the duct 10.

A recovery apparatus 28 may be connected at the end of the duct 10 to recover as much as possible of the seeding material, which is relatively expensive. The recovery apparatus 28, for example, may be of the water-spray scrubber type or may be an electrostatic precipitator, both of which are well known in the art, and which remove a large part of the seeding material. The hot gas passing through the recovery apparatus may be used in a known manner to preheat air for the combustion chamber and then discharged through a stack. From the recovery apparatus 28, the seeding material may be fed back into the seeding supply line 30 and thence into the combustion chamber 14 to complete the cycle.

As the working fluid is passed through the generator and energy is extracted therefrom, the temperature of the working fluid will drop. Because of the drop in temperature, the working fluid will become less electrically conductive and so will produce less energy at a lower density while passing through the magnetic field. To maintain the conductivity of the working fluid at a high level throughout the generator, the working fluid must be maintained at a high temperature throughout the cycle of generation. To maintain the high state of conductivity, it would be advantageous to continuously supply heat energy to the working fluid to maintain it at a high temperature as is passes through the generator.

In accordance with the present invention, the working fluid is continuously reheated as it passes through the duct 10 to keep its temperature reasonably uniform throughout the length of the duct and high enough to maintain the desired level of electrical conductivity. This may be done by continuously adding heat to the gas throughout the duct, or continuously releasing heat energy in the gas itself during its flow through the duct. This continuous reheating of the working fluid may be accomplished in any desired manner, several possible means for obtaining continuous reheat being described below.

One method of accomplishing continuous reheat of the gas is to utilize a fuel which has a sufficiently slow reaction rate so there will be a continuous combustion and heat release within the working fluid as it passes through the generator duct. The correct rate of heat release would be determined by the rate of energy extraction from the generator which in turn would be a function of the velocity of the working fluid, the electrical conductivity of the working fluid, thermal losses from the working fluid and the strength of the magnetic field. The desired rate of heat release being detrmined in this way, way, the composition of the fuel can then readily be determined to give the proper rate of combustion in the gas during its passage through the duct. In a large scale MHD generator, the continuous reheat could readily be obtained by the controlled non-homogenous mixing of the fuel and oxygen. Additional heat would be released as the working fluid proceeded downstream and the fuel mixed with the oxygen and burned. For example, any atomized fuel, such as fuel oil, could be used in which the droplet size, homogeneity or either of these can be controlled. Also, for instance, in the non-homogeneous case, natural gas may be mixed with a predetermined amonut of air or oxygen so that the mixture continuously releases heat as it proceeds down the duct. Additional fuel or oxygen, or both, could also be introduced at various points along the duct to accomplish the necessary reheating of the working fluid as it passes through the duct. As is shown in FIG. 1, the supply sources 32, 34, 36 and 38 are connected at successive points along the duct 10. Through suitable orifices in the duct, these supply sources may introduce fuel or oxygen into the duct so that heat energy may be added to the working fluid as it passes the successive points. Thus, a substantially continuous reheating cycle could be maintained as the working fluid passes through the system. Depending upon the original input fuel used, the composition of the fuel and oxygen mixture supplied along the duct would be determined. Thus, if the gaseous mixture at the input is on the fuel-rich side of stoichiometric, additional oxygen may be added through the supply sources 32, 34, 36 and 38 in a controlled manner in order to accomplish the continuous reheating of the working fluid as it passes through the duct 10. However, if the gaseous mixture at the input to the generator is on the oxygen-rich side of stoichiometric, fuel can be added progressively along the generator to accomplish the continuous reheat by supplying controlled fuel from the supply sources 32, 34, 36 and 38.

For example, if natural gas is used as the input mixture, oxygen may be added to further complete the combustion process as the mixture proceeds along the duct. Also, if coal is used as the fuel, oxygen may be added to the fuel to complete the combustion process and release energy continuously along the length of the generator duct. If there is excess oxygen in the input mixture to the generator, additional fuel, either liquid, gaseous or solid, may be added to provide the continuous reheating of the working fluid.

It can thus be seen that by utilizing any of the above techniques the gaseous working fluid will have heat energy continuously supplied as it passes through the duct 10. This will maintain the working fluid at a high temperature and so at a state of high electrical conductivity, which is necessary for an efficient cycle of operation.

Although the present invention has been described with a certain degree of particularly, it should be understood that the present disclosure has been made only by way of example and that numerous changes in the details of construction, the materials used and the combination of arrangement of parts may be resorted to without departing from the scope and the spirit of the present invention.

I claim as my invention:

1. A magnetohydrodynamic generator including means for supplying high temperature, thermally ionized gas, duct means for flow of said gas through the generator, means for providing a magnetic field in the duct means transverse to the flow of gas, electrode means disposed on opposite sides of the duct means, and means for effecting continuous heating of the gas throughout its passage through the duct means to maintain the gas at a relatively high level of electrical conductivity.

2. A magnetohydrodynamic generator including means for supplying high temperature, thermally ionized gas, duct means for flow of said gas through the generator, means for providing a magnetic field in the duct means transverse to the flow of gas, electrode means disposed on opposite sides of the duct means, means for seeding said gas with an easily ionizable material, and means for effecting continuous heating of the gas throughout its passage through the duct means to maintain the gas at a relatively high level of electrical conductivity.

3. A magnetohydrodynamic generator including means for supplying high temperature, thermally ionized gas, duct means for flow of said gas through the generator, means for providing a magnetic field in the duct means transverse to the flow of gas, electrode means disposed on opposite sides of the duct means, and means for effecting continuous release of heat in the gas during its passage through the duct means to maintain the gas at a relatively high level of electrical conductivity.

4. A magnetohydrodynamic generator including means for supplying high temperature, thermally ionized gas, duct means for flow of said gas through the generator, means for providing a magnetic field in the duct means transverse to the flow of gas, electrode means disposed on opposite sides of the duct means, means for seeding said gas with an alkali metal, and means for effecting continuous release of heat in the gas during its passage through the duct means to maintain the gas at a relatively high level of electrical conductivity.

5. A magnetohydrodynamic generator including duct means for flow of ionized gas therethrough, means for providing a magnetic field in the duct means transverse to the direction of gas flow, electrode means disposed on opposite sides of the duct means, a combustion chamber adjacent one end of the duct means, means for supplying fuel and oxygen to said combustion chamber to be burned therein to supply high temperature, thermally ionized gas to flow through the duct means, means for seeding said gas with an easily ionizable material, and means for effecting continuous heating of the gas during its passage through the duct means to maintain the gas at a relatively high level of electrical conductivity.

6. A magnetohydrodynamic generator including duct means for flow of ionized gas therethrough, means for providing a magnetic field in the duct means transverse to the direction of gas flow, electrode means disposed on opposite sides of the duct means, a combustion chamber adjacent one end of the duct means, means for supplying fuel and oxygen to said combustion chamber to be burned therein to supply high temperature, thermally ionized gas to flow through the duct means, and means for nonhomogeneously mixing said fuel and oxygen in the combustion chamber to control the rate of combustion so that heat is continuously released in the gas during its passage through the duct means.

7. A magnetohydrodynamic generator including duct means for flow of ionized gas therethrough, means for providing a magnetic field in the duct means transverse to the direction of gas flow, electrode means disposed on opposite sides of the duct means, a combustion chamber adjacent one end of the duct means, means for supplying fuel and oxygen to said combustion chamber to be burned therein to supply high temperature, thermally ionized gas to flow through the duct means, oxygen being supplied to the combustion chamber in excess of that required for combustion of fuel in the chamber, and means for supplying additional fuel at a plurality of points along the duct means to effect release of additional heat in the gas throughout its passage through the duct means.

8. A magnetohydrodynamic generator including duct means for flow of ionized gas therethrough, means for providing a magnetic field in the duct means transverse to the direction of gas flow, electrode means disposed on opposite sides of the duct means, a combustion chamber adjacent one end of the duct means, means for supplying fuel and oxygen to said combustion chamber to be burned therein to supply high temperature, thermally ionized gas to flow through the duct means, fuel being supplied to the combustion chamber in excess of that required for complete combustion, and means for supplying additional oxygen at a plurality of points along the duct means to effect release of additional heat in the gas throughout its passage through the duct means.

References Cited by the Examiner

UNITED STATES PATENTS 2,780,915  2/57  Karen _____ 60—35.6
3,099,131  7/63  Rosa _____ 310—11 X

FOREIGN PATENTS 738,511  10/55  Great Britain.

OTHER REFERENCES

MHD-Future Power Process, by Sporn and Kantrowitz, Power, November 1959, pp. 62 to 65.

ORIS L. RADER, *Primary Examiner.*

DAVID X. SLINEY, *Examiner.*